United States Patent
Blaedel et al.

(10) Patent No.: US 6,412,377 B1
(45) Date of Patent: Jul. 2, 2002

(54) METHOD FOR MAINTAINING A CUTTING BLADE CENTERED IN A KERF

(75) Inventors: Kenneth L. Blaedel, Dublin; Pete J. Davis, Pleasanton; Charles S. Landram, Livermore, all of CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 09/568,619

(22) Filed: May 10, 2000

Related U.S. Application Data

(62) Division of application No. 08/684,164, filed on Jul. 19, 1996, now Pat. No. 6,082,239.

(51) Int. Cl.[7] .............................. B26D 1/54; B27B 5/29
(52) U.S. Cl. .............................. 83/22; 83/169; 83/820; 83/821; 384/12
(58) Field of Search .................... 83/661, 676, 820, 83/821, 824, 169; 474/91; 384/12, 100, 121

(56) References Cited

U.S. PATENT DOCUMENTS

| | | | | |
|---|---|---|---|---|
| 286,706 A | * | 10/1883 | Kay ............................. | 83/661 |
| 2,815,562 A | * | 12/1957 | Wilkie et al. .................. | 83/169 |
| 2,838,825 A | * | 6/1958 | Knollenberg ............. | 83/169 X |
| 2,978,001 A | * | 4/1961 | Whisler ..................... | 83/661 X |
| 3,176,455 A | * | 4/1965 | Buchanan ................. | 83/676 X |
| 3,377,113 A | * | 4/1968 | Wilson ................... | 384/100 X |
| 3,465,794 A | * | 9/1969 | McLauchlan et al. ..... | 83/820 X |
| 3,479,097 A | * | 11/1969 | McLauchlan et al. ..... | 83/820 X |
| 3,511,544 A | * | 5/1970 | Marley ........................ | 384/12 |
| 3,557,848 A | * | 1/1971 | Wright ..................... | 83/820 X |
| 3,872,763 A | * | 3/1975 | Kayahara .................. | 83/676 X |
| 4,257,301 A | * | 3/1981 | Tuomaala ................. | 83/676 X |
| 4,369,685 A | * | 1/1983 | Trigg ........................... | 83/661 |
| 4,383,771 A | * | 5/1983 | Freytag et al. .............. | 384/121 |
| 5,137,418 A | * | 8/1992 | Sieghartner ............. | 384/121 X |

\* cited by examiner

*Primary Examiner*—Clark F. Dexter
(74) *Attorney, Agent, or Firm*—L. E. Carnahan; Alan H. Thompson

(57) ABSTRACT

A saw having a self-pumped hydrodynamic blade guide or bearing for retaining the saw blade in a centered position in the saw kerf (width of cut made by the saw). The hydrodynamic blade guide or bearing utilizes pockets or grooves incorporated into the sides of the blade. The saw kerf in the workpiece provides the guide or bearing stator surface. Both sides of the blade entrain cutting fluid as the blade enters the kerf in the workpiece, and the trapped fluid provides pressure between the blade and the workpiece as an inverse function of the gap between the blade surface and the workpiece surface. If the blade wanders from the center of the kerf, then one gap will increase and one gap will decrease and the consequent pressure difference between the two sides of the blade will cause the blade to re-center itself in the kerf. Saws using the hydrodynamic blade guide or bearing have particular application in slicing slabs from boules of single crystal materials, for example, as well as for cutting other difficult to saw materials such as ceramics, glass, and brittle composite materials.

12 Claims, 2 Drawing Sheets

METHOD FOR MAINTAINING A CUTTING BLADE CENTERED IN A KERF

This application is a division of application Ser. No. 08/684,164, filed Jul. 19, 1996, now U.S. Pat. No. 6,082,239.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to saws, particularly to saws for cutting wafers for optical and electronic applications, for example, and more particularly to a hydrodynamic blade guide or bearing for a saw which retains the saw blade centered in the saw kerf.

Cutting or slicing of materials, such as utilized in optical and electronic applications, as well as ceramics, glass, and brittle composite material is an expensive process and generally results in damaged, non-smooth, and non-flat surfaces. Substantial effort has been directed to resolve the problems associated with cutting of such materials.

Materials from which wafers are cut include optical and electronic materials in boule form such as KDP, GaAs, and silicon, as well as other brittle materials. The initial operation in manufacturing wafers from boules is the slicing or cutting process. Slicing currently suffers from its inability to produce flat surfaces free from sub-surface damage while maintaining long saw blade life and small saw kerf. The significant penalty associated with this slicing process derives not just from the cost of the sawing operation but also from the cost of subsequent processes to remove damage and to planarize the surface which are made necessary by the sawing or slicing operation. In addition, not only do the above-described slicing or cutting problems come into play, but also the cost of wasted materials lost to the saw kerf must be considered. The smaller the kerf, the greater the number of usable wafers cut from a boule.

Thus, there has been a need for a means or method by which slicing of boules, for example, can be effectively and efficiently carried out. This need is satisfied by the present invention, which utilizes a self-pumped hydrodynamic blade guide or bearing which functions to maintain the saw blade centered in the saw kerf in the workpiece. The blade guide or bearing utilizes relieved pockets or grooves on the sides of the saw blade which entrain cutting fluid, and the saw kerf in the workpiece itself provides the stator surface, whereby the trapped fluid provides pressure between the blade and the workpiece as an inverse function of the gaps between the blade surface and the workpiece surface, which results in maintaining the saw blade centered in the saw kerf.

SUMMARY OF THE INVENTION

An object of the present invention is to provide for improved cutting of materials that are difficult to cut.

A further object of the invention is to provide a guide or bearing for a saw blade.

A further object of the invention is to provide a means and method of maintaining a saw blade centered in a saw kerf.

Another object of the invention is to provide a self-pumped hydrodynamic bearing or guide for a saw.

Another object of the invention is to enable cutting or slicing of boules of material, such as silicon, KDP, GaAs, and other composite materials, which produce surfaces that are flat and free from sub-surface damage.

Another object of the invention is to provide a saw blade with relieved pockets or grooves which entrain cutting fluid which provides pressure between the blade side surfaces and the workpiece thereby causing the blade to be maintained in the center of the saw kerf.

Other objects and advantages of the invention will become apparent from the following description and accompanying drawings. The invention broadly involves a means and method for maintaining a saw blade centered in a saw kerf. More specifically the invention involves a precision saw capable of cutting material such that the cuts are flat and there is no sub-surface damage, while maintaining long saw blade life and a small saw kerf. Thus, utilizing the means and method of the present invention cuts can be make such that conventional subsequent processes to remove damage and to planarize the surface are eliminated.

The specific advantages of the saw of the present invention are: 1) long blade life, 2) small kerf, 3) reduced subsurface damage, and 4) good control of the surface flatness. This is accomplished by a precision saw which uses a self-pumped hydrodynamic guide or bearing where features, such as relieved pockets or grooves, are incorporated into the sides of the saw blade, with the saw kerf in the workpiece itself providing the bearing guide or stator surface. The features formed in both sides of the saw blade entrain cutting fluid as the blade enters the kerf in the workpiece. The trapped fluid provides pressure between the sides of the blade and the workpiece as an inverse function of the gaps between the saw blade surfaces and the workpiece surfaces. If the blade de-centers in the kerf, then one gap will increase and one gap will decrease and the consequent pressure difference between the two sides of the blade will cause the blade to re-center itself in the kerf.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1:
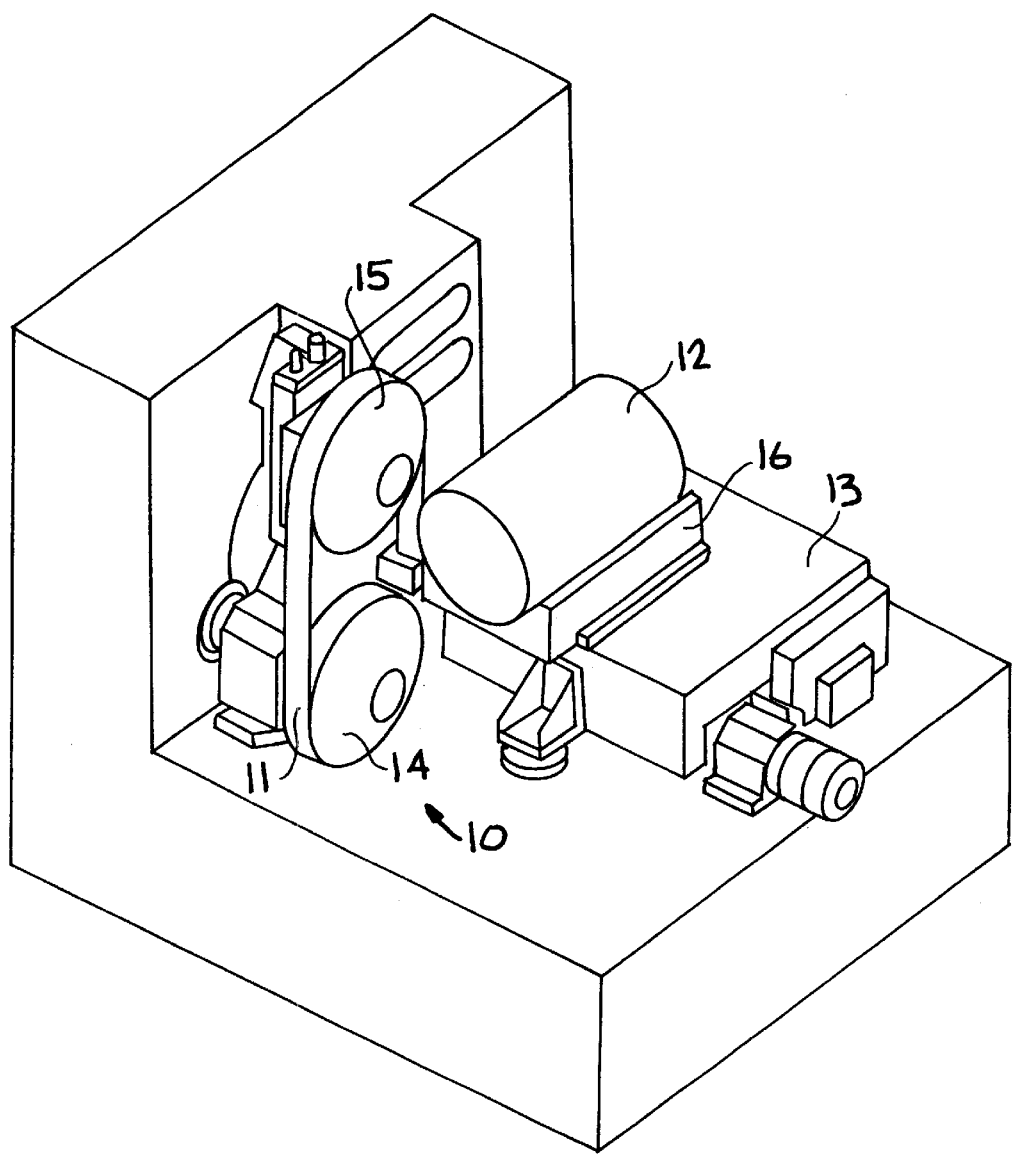
FIG. 1 illustrates an embodiment of a precision bandsaw which incorporates the hydrodynamic blade guide bearing of the present invention.

The present invention involves maintaining a saw blade in the center of a saw kerf thereby producing flat saw cuts free from sub-surface damage while maintaining long blade life and a small kerf. A kerf is a slit that is made in a workpiece during cutting action. The width of the kerf depends on the thickness of the saw blade and the ability to maintain the saw blade cut in a straight line. The invention utilizes a saw of conventional design in which the blade is modified so as to produce a self-pumped hydrodynamic bearing for guiding the saw blade. The sides of the blade are provided with features, such as relieved pockets or grooves, which entrain cutting fluid as the blade enters the kerf in the workpiece. The kerf in the workpiece itself provides the bearing stator surface. The trapped fluid provides pressure between the blade and the workpiece as an inverse function of the gap between the blade surface and the workpiece surface. If the blade wanders from the center of the kerf (de-centers), then one gap will increase and one gap will decrease and the consequent pressure difference between the two sides of the blade will cause the blade to re-center itself in the kerf. Therefore, the restorative force resulting from a perturbation causing a decentering of the blade in the kerf will arise as a consequence of the pressure difference across the blade. This restorative force arises in addition to that solely from the tension in the blade as is the case in a conventional saw. The consequence of the additional restorative force is that blade tension can be reduced and still maintain a restorative force. A reduction in blade tension allows a reduction in blade thickness and therefore a reduction in kerf width.

The pockets that entrain the fluid can be embodied in a number of ways. For example, pocket patterns may include wedge and chevron (i.e., vee shaped grooves) of uniform depth. The hydrodynamic bearing or blade guide can be incorporated into a circular OD saw blade, an ID saw blade, or a linear band saw blade. The bearing or guide creates a restoring force orthogonal to the direction of the blade travel to resist deflection and bending and maintain a straight cut. Asymetric pocket patterns can also provide the added feature of a forward directed force pushing the blade into the cut. The benefit of this is to counter the feed force immediately between the blade and the kerf walls rather than between the blade and the drive/guide wheels of the blade support.

By incorporation of the hydrodynamic bearing or blade guide, saws can be effectively utilized in slicing slabs from boules of single crystal optical materials such as KDP or boules of sapphire used as substrates for electronics, as well as for slicing slabs from boules of materials such as silicon (Si), gallium arsenide (GaAs) for integrated circuits and crystalline silicon for photovoltaic cells. In addition, the hydrodynamic bearing or blade guide will aid in slicing brittle and otherwise difficult to saw materials such as ceramics, glass, and composite materials that contain a brittle phase.

The specific advantages of a saw utilizing the hydrodynamic bearing or blade guide are: 1) long blade life and small kerf because the blade can run at lower tension, because the restorative force comes not just from blade tension but also from the hydrodynamic blade bearing or guide; 2) reduced subsurface damage because the hydrodynamic blade bearing or guide dramatically increases the damping of the blade vibrations, and 3) good control of surface flatness because the hydrodynamic blade bearing or guide adds very high restorative force from any perturbations to the lateral position of the blade in the kerf.

Cost reduction is realized because a number of the subsequent manufacturing operations such as lapping or turning can be reduced or eliminated. Cost reduction is also realized because of waste disposal (consider for example gallium arsenide) is reduced by the small kerf. In addition, more slabs are available from a single boule.

Figure 2:
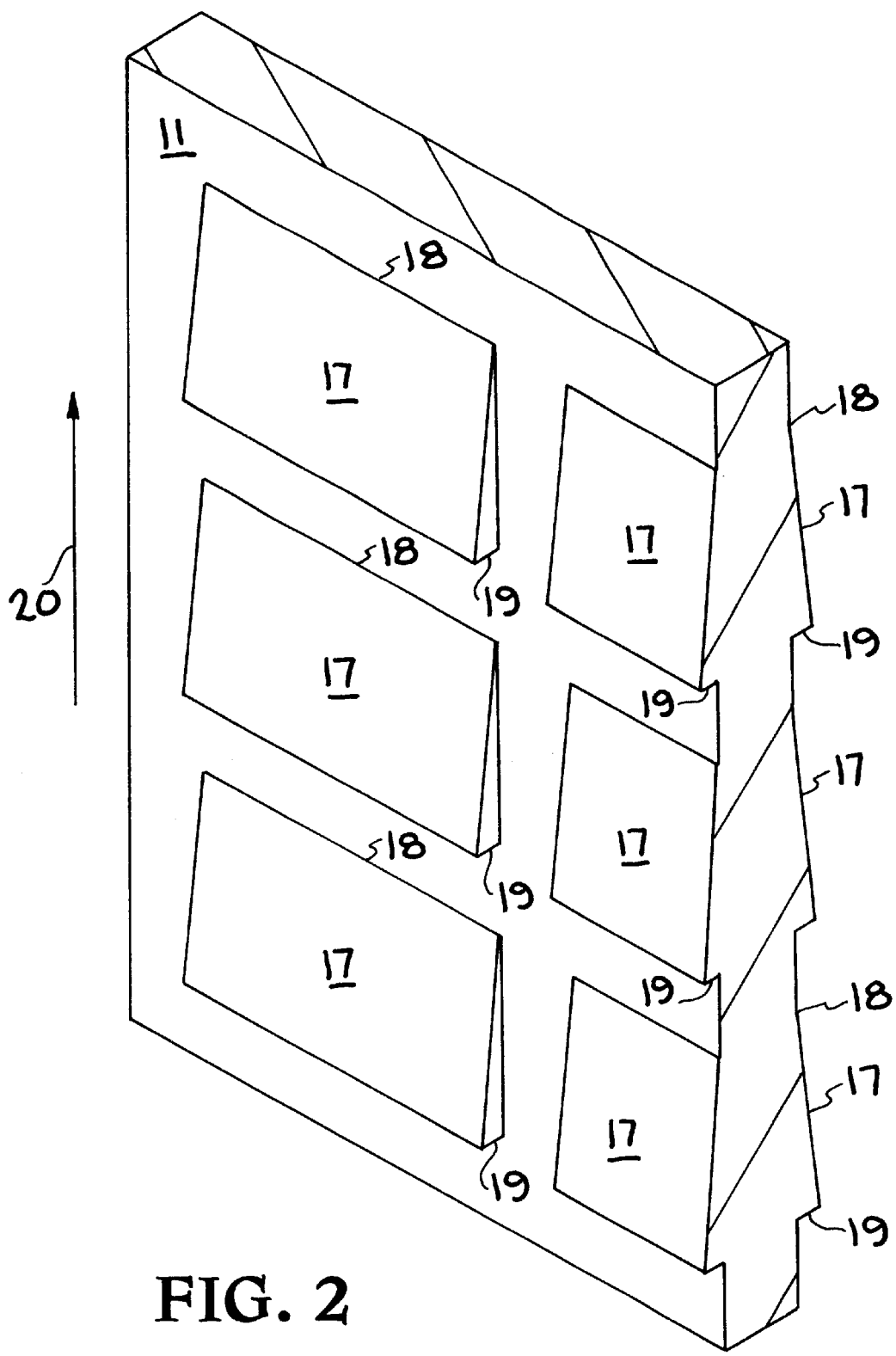
FIG. 2 is an enlarged partial cross-sectional view of the bandsaw blade of the FIG. 1 apparatus illustrating a wedge design formed in the sides of the blade to entrain cutting fluid to produce the hydrodynamic blade guide or bearing.

Referring now to the drawings, FIG. 1 illustrates a bandsaw utilized to slice boules of material such as silicon, KDP and GaAs to form wafers or substrates. The bandsaw, generally indicated at 10 includes a blade or band 11, positioned to cut through a boule 12 mounted on a support table 13, as known in the art. The blade 11 rotates around a drive gear or spindle 14 and an adjustable gear or spindle 15, and boule 12 is located on a movable member or slide 16 operatively connected to support table 13 or to hold and translate the boule 12 for slicing. Both sides of blade 11 are provided with pockets, grooves, or other cut-away sections, and as seen in FIG. 2, the pockets, grooves, or features indicated generally at 17 are in the configuration of wedges in this embodiment, but may be of other configurations. The wedges 17 taper from a tip or point 18 to a heel 19, with the heels 19 functioning to entrain cutting fluid when the blade 11 is rotated in the direction of arrow 20. The gap, which is formed between the side of the blade and the side of the kerf and contains the cutting fluid, decreases as the saw blade enters the kerf from tip to heel. Higher pressure is generated as the gap decreases.

The cutting fluids available during typical sawing operations are used to generate the necessary guiding hydrodynamic forces, in the same way that lubricating oil generates forces in sliding mechanical bearings. Two cutting fluids were considered for initial testing, light oil for KDP, and water for silicon. Also, the pockets or grooves were initially in the form or configuration of wedges, because analytic solutions were available and thus initial testing using this configuration could be effectively carried out. During the initial testing a large rotating disk was used to simulate a bandsaw blade, wedge features were machined into the face of a bronze pad, and the pad was then positioned on the rotating disk. A Kistler dynamometer was mounted beneath the bronze pad to measure both the normal and shear forces created by the hydrodynamic bearing or guide. Water was utilized as the cutting fluid in the initial verification testing.

The above-referenced experimental testing, using a wedge configuration in the rotating disk used to simulate the blade 11 of FIGS. 1 and 2 were conducted by rotating the disk adjacent a bearing pad at a fixed speed (300 rpm/1260 sq. ft. per min.) and changing the gap between the bearing pad and the rotating disk. The gap was varied from a stand off of 0.017 inch to 0.008 inch. The wedge shaped features 17, for example, each have a length of 1 inch and a width of 0.5 inch, with a 10% slope from tip or point 18 to heel 19. It has been established that using light oil as the cutting fluid and wedge shaped features of the above size can generate pressure and shear near 1 psi with a clearance (gap) of 3–4 mils and blade speeds of less than 3000 ft/min. If the wedges 17 of FIG. 2 are oriented at an angle (1° to 5°) with respect to saw blade 11, a component of the shear force can provide a normal force toward the saw cutting edge. Using water (viscosity of 1 centipoise) as the cutting fluid, a clearance of 0.5 mil allows a saw speed of only 1500 ft/min. Using light oil (viscosity of 87 centipoise) allows a higher speed of 3000 ft/min with a clearance of 3.4 mil. Speeds greater than 3000 ft/min require higher viscosities or smaller clearances with the penalty of higher shear forces.

It has thus been shown that the present invention provides a self-pumped hydrodynamic bearing for guiding a saw blade to enable flat cuts through difficult to cut material and reducing or eliminating sub-surface damage while maintaining long blade life and small kerf. This by use of the hydrodynamic bearing or guide cost reduction is realized from the reduction or elimination of subsequent manufacturing operations normally associated with hard to cut materials. In addition, cost reduction is realized because of a reduction in waste disposal, such as common when cutting gallium arsenide, due to the reduced size of the kerf when using the hydrodynamic bearing or blade guide. In addition due to the small kerf during cutting operations, more slabs, wafers, substrates, etc., are available from a single boule of material.

While a specific embodiment has been illustrated and described and specific parameters, test data, etc., have been described to exemplify the invention, such are not intended to be limiting. Modifications and changes may become apparent to those skilled in this art, and it is intended that the scope of the invention be limited only by the scope of the appended claims.

What is claimed is:

1. A method for producing flat cuts-through a material while maintaining a cutting blade in a center of a kerf in material being cut, while at least decreasing sub-surface damage, and while maintaining long blade life, including:

providing a cutting blade, forming means on side surfaces of the cutting blade for entraining a cutting fluid when the cutting blade is in motion, providing a quantity of cutting fluid, at least some of which is between the cutting blade and material being cut, and putting the cutting blade in motion for cutting material and entraining the cutting fluid, whereby cutting fluid entrained by the means on the side surfaces of the cutting blade produces a pressure on the cutting blade causing the cutting blade to remain centered in a kerf formed in the material being cut by the cutting blade.

2. The method of claim 1, wherein forming the cutting fluid entraining means on the side surfaces of the cutting blade is carried out by removing sections of the cutting blade.

3. The method of claim 2, wherein the removed sections of the cutting blade are configured to define a plurality of cut-aways selected from the group of wedge-shaped, vee-shaped, and chevron configurations.

4. The method of claim 3, wherein the cutting blade is a saw blade selected from the group of outside diameter, inside diameter, and linear band type saw blades.

5. The method of claim 4, wherein the saw blade is a band saw, and wherein putting the cutting blade in motion includes rotating the band saw so as to cut slabs of material.

6. A method for forming a hydrodynamic bearing for maintaining a cutting blade in a center of a kerf in material being cut, comprising:

providing a cutting blade, providing a supply of cutting fluid, at least some of which is between the cutting blade and material being cut, and forming means on the cutting blade for entraining the cutting fluid as the cutting blade is moved, and putting the cutting blade in motion including moving the cutting blade through the material and entraining the cutting fluid by the means on the cutting blade, whereby the entrained cutting fluid forms a hydrodynamic bearing for the cutting blade.

7. The method of claim 6, wherein forming means for entraining cutting fluid is carried out by forming means on both sides of the cutting blade for entraining cutting fluid as the cutting blade is moved.

8. The method of claim 7, wherein forming the means for entraining cutting fluid is carried out by forming cut-away sections on both sides of the cutting blade.

9. The method of claim 8, wherein forming the cut-away sections is carried out to form a plurality of cut-aways selected from the group consisting of wedge-shaped, V-shaped, and chevron configurations.

10. The method of claim 6, wherein forming the means for entraining cutting fluid is carried out by forming a plurality of cut-away sections in each side of the cutting blade.

11. The method of claim 10, wherein forming the cut-away sections is carried out by forming cut-aways of a wedge configuration.

12. The method of claim 6, wherein forming the means for entraining cutting fluid is carried out by forming a plurality of wedge configurations on the cutting blade.

* * * * *